US011087090B2

(12) United States Patent
Sapugay et al.

(10) Patent No.: US 11,087,090 B2
(45) Date of Patent: Aug. 10, 2021

(54) SYSTEM FOR FOCUSED CONVERSATION CONTEXT MANAGEMENT IN A REASONING AGENT/BEHAVIOR ENGINE OF AN AGENT AUTOMATION SYSTEM

(71) Applicant: ServiceNow, Inc., Santa Clara, CA (US)

(72) Inventors: Edwin Sapugay, Foster City, CA (US); Anil Kumar Madamala, Sunnyvale, CA (US); Maxim Naboka, Santa Clara, CA (US); Srinivas SatyaSai Sunkara, Sunnyvale, CA (US); Lewis Savio Landry Santos, Santa Clara, CA (US); Murali B. Subbarao, Saratoga, CA (US)

(73) Assignee: ServiceNow, Inc., Santa Clara, CA (US)

( * ) Notice: Subject to any disclaimer, the term of this patent is extended or adjusted under 35 U.S.C. 154(b) by 134 days.

(21) Appl. No.: 16/239,147

(22) Filed: Jan. 3, 2019

(65) Prior Publication Data
US 2019/0294675 A1    Sep. 26, 2019

Related U.S. Application Data

(60) Provisional application No. 62/646,915, filed on Mar. 23, 2018, provisional application No. 62/646,916, (Continued)

(51) Int. Cl.
*G06F 40/30* (2020.01)
*G06F 40/35* (2020.01)
(Continued)

(52) U.S. Cl.
CPC ............ *G06F 40/30* (2020.01); *G06F 40/295* (2020.01); *G06F 40/35* (2020.01); *G10L 15/22* (2013.01); *G10L 15/26* (2013.01)

(58) Field of Classification Search
CPC .......... G06F 40/00; G06F 40/10; G06F 40/14; G06F 40/137; G06F 40/12; G06F 40/132;
(Continued)

(56) References Cited

U.S. PATENT DOCUMENTS 7,062,683 B2    6/2006    Warpenburg
7,509,653 B2    3/2009    Das et al.
(Continued)

OTHER PUBLICATIONS

Susanne Salmon-Alt et al.: "Reference Resolution within the Framework of Cognitive Grammar Annotating Anaphoric information view project PROTEUS View project Reference Resolution within the Framework of Cognitive Grammar", International Colloqiumon CognitiveScience, 2001, pp. 1-16; XP055611830; retrieved https://www.researchgate.net/profile/Laurent-Romary/publication/45872575_reference_Resolution_withn_the_Framework_of_Cognitive_Grammar/links/00912f50bf287749203000000/Reference-Resolution-within-the-Framework-of-Cognitive-Grammar.pdf (retrieved.
(Continued)

*Primary Examiner* — Andrew C Flanders
(74) *Attorney, Agent, or Firm* — Fletcher Yoder PC

(57) ABSTRACT

An agent automation system includes a memory configured to store a reasoning agent/behavior engine (RA/BE) including a first persona and a current context and a processor configured to execute instructions of the RA/BE to cause the first persona to perform actions comprising: receiving intents/entities of a first user utterance; recognizing a context overlay cue in the intents/entities of the first user utterance, wherein the context overlay cue defines a time period; updating the current context of the RA/BE by overlaying context information from at least one stored episode associated with the time period; and performing at least one action based on the intents/entities of the first user utterance and the current context of the RA/BE.

19 Claims, 13 Drawing Sheets

Related U.S. Application Data filed on Mar. 23, 2018, provisional application No. 62/646,917, filed on Mar. 23, 2018, provisional application No. 62/657,751, filed on Apr. 14, 2018, provisional application No. 62/652,903, filed on Apr. 5, 2018, provisional application No. 62/659,710, filed on Apr. 19, 2018.

(51) Int. Cl.
*G10L 15/22* (2006.01)
*G06F 40/295* (2020.01)
*G10L 15/26* (2006.01)

(58) Field of Classification Search
CPC ...... G06F 40/146; G06F 40/154; G06F 40/20;
G06F 40/205; G06F 40/211; G06F
40/216; G06F 40/221; G06F 3/167; G06F
40/30; G06F 40/35; G06F 16/243; G06F
16/2433; G06F 16/2435; G06F 16/2438;
G06F 16/244; G06F 16/2443; G06F
16/2445; G06F 16/2448; G06F 40/123;
G10L 15/00; G10L 15/18; G10L 15/1822;
G10L 15/1815; G10L 15/183; G10L
15/187; G10L 15/22; G10L 15/26
See application file for complete search history.

(56) References Cited

U.S. PATENT DOCUMENTS

| | | |
|---|---|---|
| 7,610,512 B2 | 10/2009 | Gerber |
| 7,617,073 B2 | 11/2009 | Trinon |
| 7,617,500 B2 | 11/2009 | Astl et al. |
| 7,630,784 B2 | 12/2009 | Hunt et al. |
| 7,653,650 B2 | 1/2010 | Kulkarni et al. |
| 7,849,201 B1 | 12/2010 | Subbarao et al. |
| 7,890,802 B2 | 2/2011 | Gerber |
| 8,006,240 B2 | 4/2011 | Bhatkhande et al. |
| 7,945,860 B2 | 5/2011 | Vambenepe |
| 7,958,031 B2 | 6/2011 | Hunt et al. |
| 7,966,398 B2 | 6/2011 | Wiles |
| 7,971,147 B2 | 6/2011 | Subbarao et al. |
| 8,112,354 B2 | 2/2012 | Lalwani et al. |
| 8,156,479 B2 | 4/2012 | Fong et al. |
| 8,224,683 B2 | 7/2012 | Manos |
| 8,433,654 B2 | 4/2013 | Subbarao et al. |
| 8,473,361 B2 | 6/2013 | Subbarao et al. |
| 8,612,289 B2 | 12/2013 | Subbarao et al. |
| 8,650,078 B2 | 2/2014 | Subbarao et al. |
| 8,674,992 B2 | 3/2014 | Poston |
| 9,626,717 B2 | 4/2017 | Sapugay et al. |
| 9,633,004 B2 | 4/2017 | Giuli et al. |
| 2006/0130038 A1 | 6/2006 | Claussen et al. |
| 2007/0261065 A1 | 11/2007 | Astl et al. |
| 2008/0075444 A1 | 3/2008 | Subbarao et al. |
| 2010/0185437 A1* | 7/2010 | Visel ............... G06F 40/30 704/9 |
| 2012/0246073 A1 | 9/2012 | Gore et al. |
| 2012/0290938 A1 | 11/2012 | Subbarao et al. |
| 2013/0031476 A1* | 1/2013 | Coin ............... G06F 40/56 715/706 |
| 2013/0275164 A1* | 10/2013 | Gruber ............... G06Q 10/02 705/5 |
| 2014/0279274 A1 | 9/2014 | Subbarao et al. |
| 2014/0297457 A1 | 10/2014 | Sapugay et al. |
| 2014/0297458 A1 | 10/2014 | Sapugay et al. |
| 2015/0186504 A1* | 7/2015 | Gorman ............... G06F 40/30 707/752 |
| 2015/0269573 A1 | 9/2015 | Subbarao et al. |
| 2017/0178626 A1 | 6/2017 | Gruber et al. |
| 2017/0242886 A1* | 8/2017 | Jolley ............... G06F 40/205 |
| 2018/0308473 A1* | 10/2018 | Scholar ............... A63F 13/80 |

OTHER PUBLICATIONS

Extended European Search Report for European Application No. 19162886.6 dated Aug. 20, 2019; 10 pgs.

\* cited by examiner

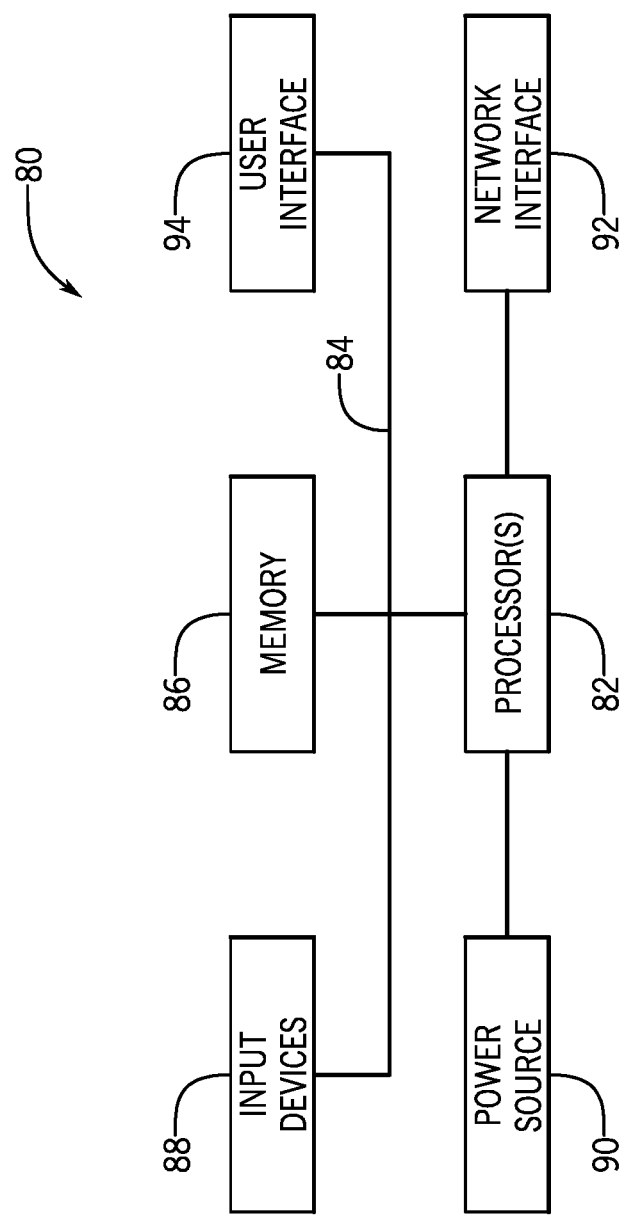

SYSTEM FOR FOCUSED CONVERSATION CONTEXT MANAGEMENT IN A REASONING AGENT/BEHAVIOR ENGINE OF AN AGENT AUTOMATION SYSTEM

CROSS-REFERENCE

This application claims priority from and the benefit of U.S. Provisional Application No. 62/646,915, entitled "HYBRID LEARNING SYSTEM FOR NATURAL LANGUAGE UNDERSTANDING," filed Mar. 23, 2018; U.S. Provisional Application No. 62/646,916, entitled "VOCABULARY MANAGEMENT IN A NATURAL LEARNING FRAMEWORK," filed Mar. 23, 2018; U.S. Provisional Application No. 62/646,917, entitled "METHOD AND SYSTEM FOR AUTOMATED INTENT MINING, CLASSIFICATION AND DISPOSITION," filed Mar. 23, 2018; U.S. Provisional Application No. 62/657,751, entitled "METHOD AND SYSTEM FOR FOCUSED CONVERSATION CONTEXT MANAGEMENT IN A BEHAVIOR ENGINE," filed Apr. 14, 2018; U.S. Provisional Application No. 62/652,903, entitled "TEMPLATED RULE-BASED DATA AUGMENTATION FOR INTENT EXTRACTION FROM SPARSE DATA," filed Apr. 5, 2018; and U.S. Provisional Application No. 62/659,710, entitled "WRITTEN-MODALITY PROSODY SUBSYSTEM IN A NLU FRAMEWORK," filed Apr. 19, 2018, which are incorporated by reference herein in their entirety for all purposes.

BACKGROUND

The present disclosure relates generally to the fields of natural language understanding (NLU), and more specifically to a Reasoning Agent/Behavior Engine (RA/BE) that enables for focused conversation context management.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations and these resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Such a cloud computing service may host an autonomous conversational agent, also referred to herein as a virtual agent, that is designed to automatically respond to client issues based on natural language requests from a user. Reasoning Agents/Behavior Engines (RA/BEs) generally define the behavior of such virtual agents, enabling them to, for example, carry conversations with users, enact requests from users, respond to questions, react to user statements, and so forth. In order to have meaningful and productive conversations between users and virtual agents, it is presently recognized that it would be beneficial for the RA/BE to maintain context. Current RA/BE implementations either rely solely on the context of the current exchange between the user and virtual agent or are completely context-less, which substantially hinders the abilities and the domain specificity of such RA/BEs. As such, it is recognized that a framework is needed for managing virtual agent context in such a way as to ensure that the appropriate reasoning environment is available to the agent during user interaction.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to an agent automation system that is capable of extracting meaning from user utterances, such as requests received by a virtual agent (e.g., a chat agent), and responding to these user utterances by performing suitable actions (e.g., performing requested functions or generating meaningful responses). To do this, present embodiments include a Reasoning Agents/Behavior Engine (RA/BE) having one or more personas that implement an episodic context technique to maintain a current context that is used to perform suitable tasks in response to a user utterance. In certain embodiments, the RA/BE may include a number of different personas, each designed to address different aspects or facets of the RA/BE behavior, such as a sales persona, a marketing persona, a support persona, a persona for addressing requests during business hours, a persona for addressing requests after business hours, and so forth. The personas of the RA/BE include a script, as well as any other supporting configuration data, designed to perform predetermined actions, based on the current context, in response to particular intent/entities detected in the user utterance. Additionally, these personas are configured to update the current context of an episode based on context information stored within frames of other conversational episodes between the user and virtual agent. In particular, a persona of the RA/BE may access context information from different types of frames, including frames locally managed by each persona, service-based frames that enable service callouts for context information from other services, and remote persona-based frames that retrieve context information from other personas of the RA/BE.

For example, in certain embodiments, a persona of a RA/BE may initially respond to intents/entities extracted from a user utterance based on a current context that only includes information from the current episode (e.g., today's episode context). However, when the intent/entities of a user utterance includes a cue that references the context associated with another episode (e.g., last Thursday's context), the RA/BE responds by retrieving and overlaying the context of the current episode with the context of the referenced episode based on persona-specific overlay rule templates. As such, the persona of the RA/BE can subsequently perform suitable actions in response to the user utterance, as well as subsequent user utterances of the current episode, in a context-appropriate manner. The disclosed RA/BE can also process a user utterance that includes a cue referencing context associated with multiple episodes within a time period. To do this, the disclosed RA/BE aggregates the context of multiple episodes within the time period based on person-specific multi-episode aggregation rules, and then overlays the current context with information from the aggregate context based on persona-specific overlay rule templates. Accordingly, the disclosed RA/BE design provides a substantial improvement by enabling virtual agents having automatic context management.

BRIEF DESCRIPTION OF THE DRAWINGS

Various aspects of this disclosure may be better understood upon reading the following detailed description and upon reference to the drawings in which:

FIG. 3 is a block diagram of a computing device utilized in a computing system that may be present in FIG. 1 or 2, in accordance with aspects of the present technique;

DETAILED DESCRIPTION OF SPECIFIC EMBODIMENTS

Figure 1:
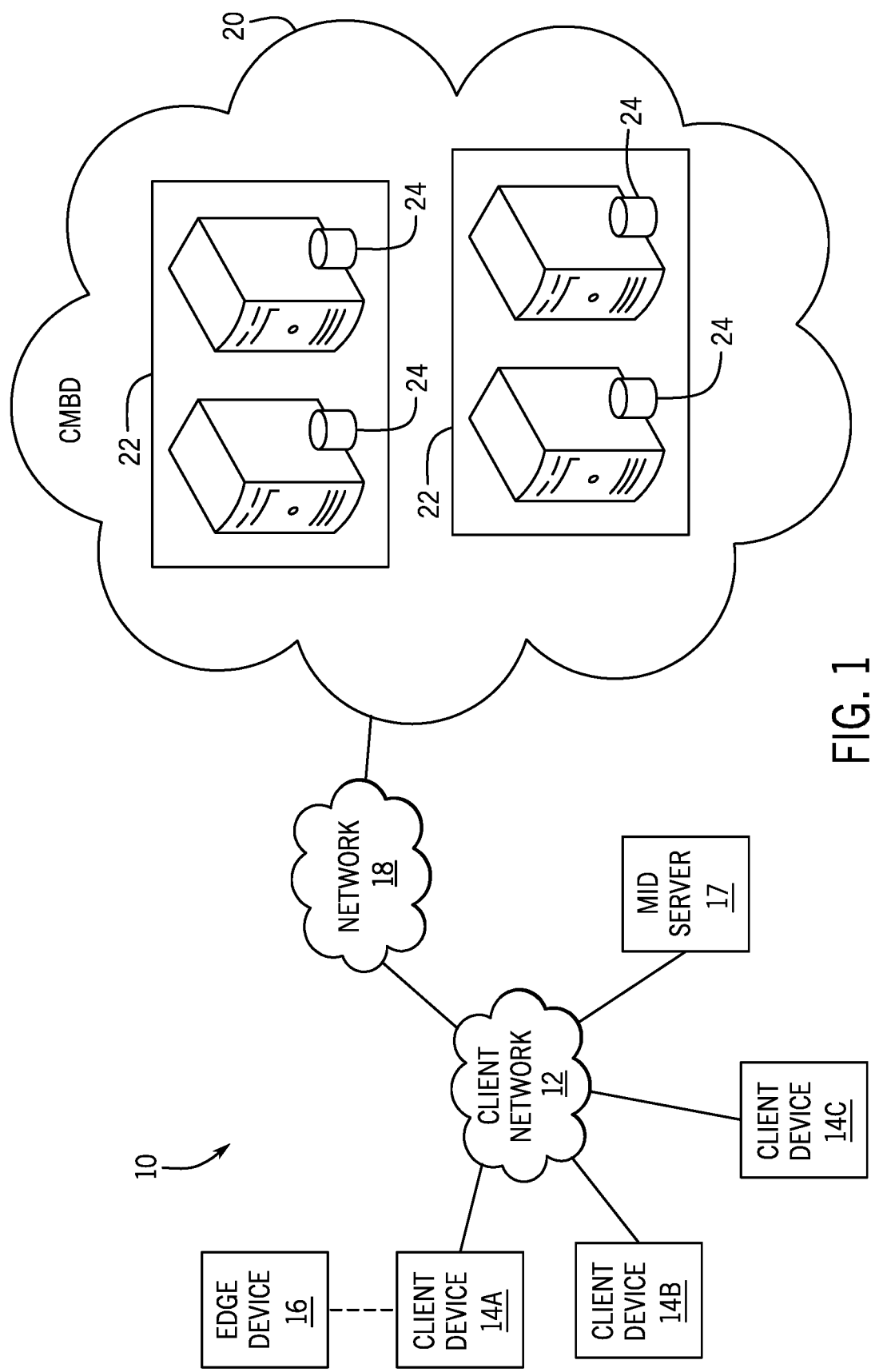
FIG. 1 is a block diagram of an embodiment of a cloud computing system in which embodiments of the present technique may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" or "computing device" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "machine-readable medium" may include a single medium or multiple media (e.g., a centralized or distributed database, and/or associated caches and servers) that store one or more instructions or data structures. The term "non-transitory machine-readable medium" shall also be taken to include any tangible medium that is capable of storing, encoding, or carrying instructions for execution by the computing system and that cause the computing system to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

As used herein, the terms "application" and "engine" refer to one or more sets of computer software instructions (e.g., computer programs and/or scripts) executable by one or more processors of a computing system to provide particular functionality. Computer software instructions can be written in any suitable programming languages, such as C, C++, C#, Pascal, Fortran, Perl, MATLAB, SAS, SPSS, JavaScript, AJAX, and JAVA. Such computer software instructions can comprise an independent application with data input and data display modules. Alternatively, the disclosed computer software instructions can be classes that are instantiated as distributed objects. The disclosed computer software instructions can also be component software, for example JAVABEANS or ENTERPRISE JAVABEANS. Additionally, the disclosed applications or engines can be implemented in computer software, computer hardware, or a combination thereof.

As used herein, the term "framework" refers to a system of applications and/or engines, as well as any other supporting data structures, libraries, modules, and any other supporting functionality, that cooperate to perform one or more overall functions. In particular, a "natural language understanding framework" or "NLU framework" comprises a collection of computer programs designed to process and derive meaning (e.g., intents, entities) from natural language utterances based on an intent/entity model. As used herein, a "reasoning agent/behavior engine" or "RA/BE" refers to a rule-based agent, such as a virtual agent, designed to interact with users based on a conversation model. For example, a "virtual agent" may refer to a particular example of a RA/BE that is designed to interact with users via natural language requests in a particular conversational or communication channel. With this in mind, the terms "virtual agent" and "RA/BE" are used interchangeably herein. By way of specific example, a virtual agent may be or include a chat agent that interacts with users via natural language requests and responses in a chat room environment. Other examples of virtual agents may include an email agent, a forum agent, a ticketing agent, a telephone call agent, and so forth, which interact with users in the context of email, forum posts, and autoreplies to service tickets, phone calls, and so forth.

As used herein, an "intent" refers to a desire or goal of an agent which may relate to an underlying purpose of a communication, such as an utterance. As used herein, an "entity" refers to an object, subject, or some other parameterization of an intent. It is noted that, for present embodiments, entities are treated as parameters of a corresponding intent. More specifically, certain entities (e.g., time and location) may be globally recognized and extracted for all intents, while other entities are intent-specific (e.g., merchandise entities associated with purchase intents) and are generally extracted only when found within the intents that define them. As used herein, an "intent/entity model" refers to an intent model that associates particular intents with particular sample utterances, wherein certain entity data may be encoded as a parameter of the intent within the model. As used herein, a "corpus" refers to a captured body of source data that includes interactions between various users and virtual agents, wherein the interactions include communications or conversations within one or more suitable types of media (e.g., a help line, a chat room or message string, an email string). As used herein, "source data" may include any suitable captured interactions between various agents, including but not limited to, chat logs, email strings, documents, help documentation, frequently asked questions (FAQs), forum entries, items in support ticketing, recordings of help line calls, and so forth. As used herein, an "utterance" refers to a single natural language statement made by a user or agent that may include one or more intents. As such, an utterance may be part of a previously captured corpus of source data, and an utterance may also be a new statement received from a user as part of an interaction with a virtual agent.

As used herein, the terms "dialog" and "conversation" refer to an exchange of utterances between a user and a virtual agent over a period of time (e.g., a day, a week, a month, a year, etc.). As used herein, an "episode" refers to distinct portions of dialog that may be delineated from one another based on a change in topic, a substantial delay between communications, or other factors. As used herein, "context" refers to information associated with an episode of a conversation that can be used by the RA/BE to determine suitable actions in response to extracted intents/entities of a user utterance. For embodiments discussed below, context information is stored as a hierarchical set of parameters (e.g., name/value pairs) that are associated with a frame of an episode of a dialog, wherein "hierarchical" means that a value of a parameter may itself be another set of parameters (e.g., a set of name/value pairs). As used herein, "domain specificity" refers to how attuned a system is to correctly extracting intents and entities expressed actual conversations in a given domain and/or conversational channel.

As mentioned, a computing platform may include a virtual agent, or another similar RA/BE, that is designed to automatically respond to user requests to perform functions or address issues via the platform. In order to have meaningful and productive conversations between users and virtual agents, it is presently recognized that it would be beneficial for the virtual agent to maintain context. In particular, like a human participant in a conversation, the virtual agent should be able to recall what has been said by the other conversation participants in order to formulate proper responses and perform user-requested tasks. Furthermore, the virtual agent should understand what contexts and/or contextual parameters apply to the current conversation. For instance, the "meeting start" and "meeting end" contexts for a meeting room reservation that occurred in the distant past will probably not apply to a current meeting room reservation request. Additionally, it is recognized that there may be instances where the user may provide utterance that contain cues for the virtual agent to recall prior context (e.g., "Remember what we discussed 2 days ago?"). However, as mentioned, current virtual agent implementations either rely solely on the context of the current exchange between the user and virtual agent or are completely context-less, which substantially hinders the abilities and the accuracy of such virtual agents.

Accordingly, present embodiments are generally directed toward an agent automation framework having a RA/BE that maintains a current context for an episode, which is used by one or more personas of the RA/BE to perform suitable tasks in response to user utterances. In certain embodiments, the RA/BE may include a number of different personas, each designed to address different aspects or facets of the RA/BE behavior (e.g., a sales persona, a marketing persona, a support persona, a persona for addressing requests during business hours, a persona for addressing requests after business hours, and so forth). As discussed below, each persona of the RA/BE includes a script designed to perform predetermined actions in response to particular intent/entities detected in the user utterance, based on the current context. Additionally, these personas are configured to update the current context of an on-going episode based on information stored within frames of other episodes. In particular, each persona of the RA/BE can access episodic context information from different types of frames, including frames locally managed by each persona, service-based frames that enable service callouts for context information from other services (e.g., weather services, stock services, news services, etc.), and remote persona-based frames that retrieve context information from the locally managed frames of other personas of the RA/BE.

As discussed below, the disclosed RA/BE is designed to detect cues from user utterances that reference the context associated with a particular episode, and respond by retrieving and overlaying the context of the current episode with the context of the referenced episode based on persona-specific overlay rule templates. The disclosed RA/BE can also process a user utterance that includes a cue referencing context associated with multiple episodes occurring within a time period by aggregating the context of multiple episodes within the indicated time period and overlaying the current context with the aggregate context information. After updating the current context, the persona of the RA/BE can subsequently perform suitable actions in response to the user utterance, as well as subsequent user utterances of the current episode, in a context-appropriate manner. Accordingly, the disclosed RA/BE design enables a substantial improvement by providing automatic context management to virtual agents, which enhances the abilities and the accuracy of these virtual agents to address complex natural language requests from users.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may host a management database (CMDB) system and/or other suitable systems. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes an administration or managerial device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
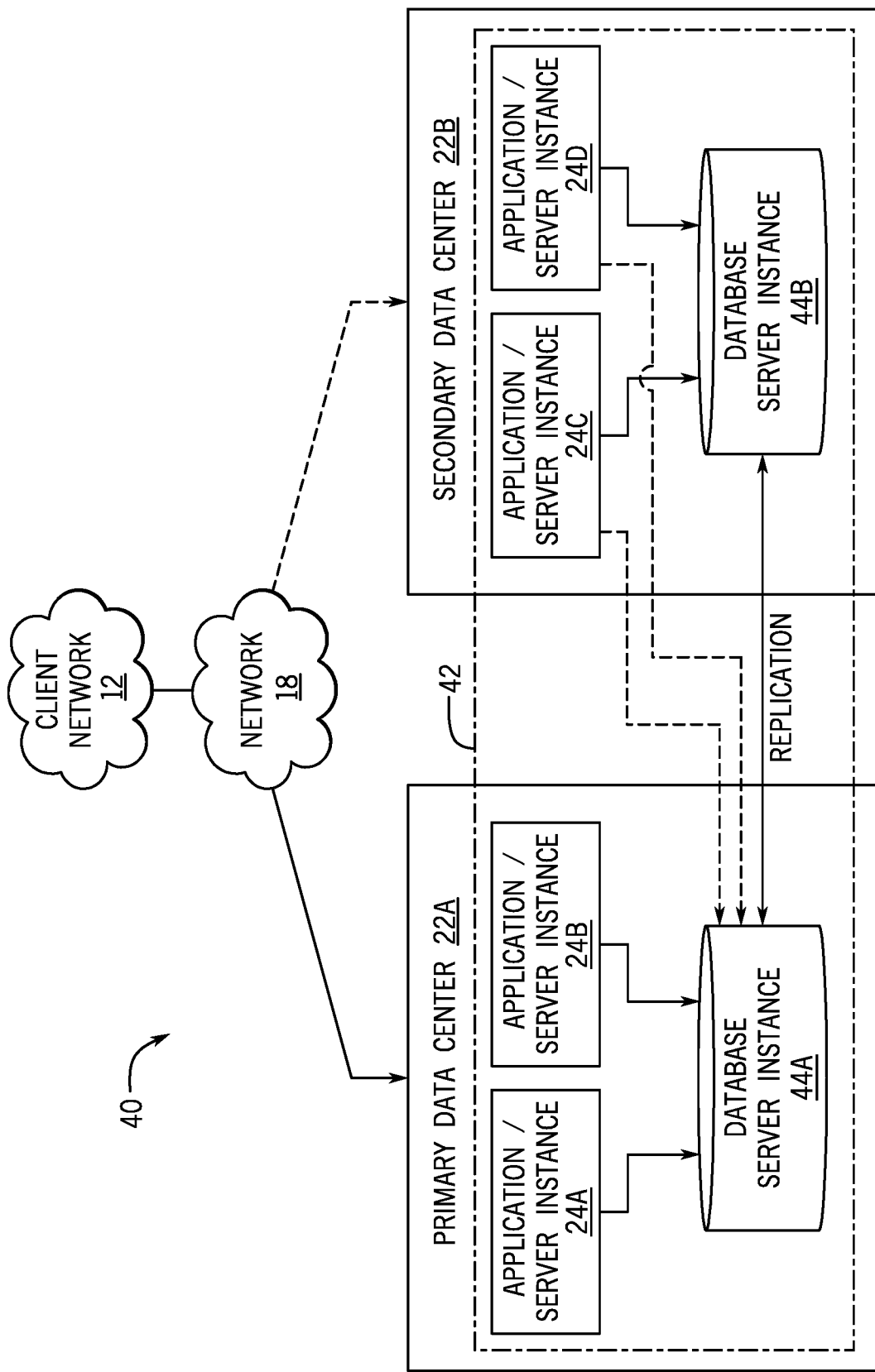
FIG. 2 is a block diagram of an embodiment of a multi-instance cloud architecture in which embodiments of the present technique may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may back up data to the secondary virtual database server 44B using a database replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and/or 24D and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 include suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

It should be appreciated that the cloud-based platform 20 discussed above provides an example an architecture that may utilize NLU technologies. In particular, the cloud-based platform 20 may include or store a large corpus of source data that can be mined, to facilitate the generation of a number of outputs, including an intent/entity model. For example, the cloud-based platform 20 may include ticketing source data having requests for changes or repairs to particular systems, dialog between the requester and a service technician or an administrator attempting to address an issue, a description of how the ticket was eventually resolved, and so forth. Then, the generated intent/entity model can serve as a basis for classifying intents in future requests, and can be used to generate and improve a conversational model to support a virtual agent that can automatically address future issues within the cloud-based platform 20 based on natural language requests from users. As such, in certain embodiments described herein, the disclosed agent automation framework is incorporated into the cloud-based platform 20, while in other embodiments, the agent automation framework may be hosted and executed (separately from the cloud-based platform 20) by a suitable system that is communicatively coupled to the cloud-based platform 20 to process utterances, as discussed below.

Figure 4A:
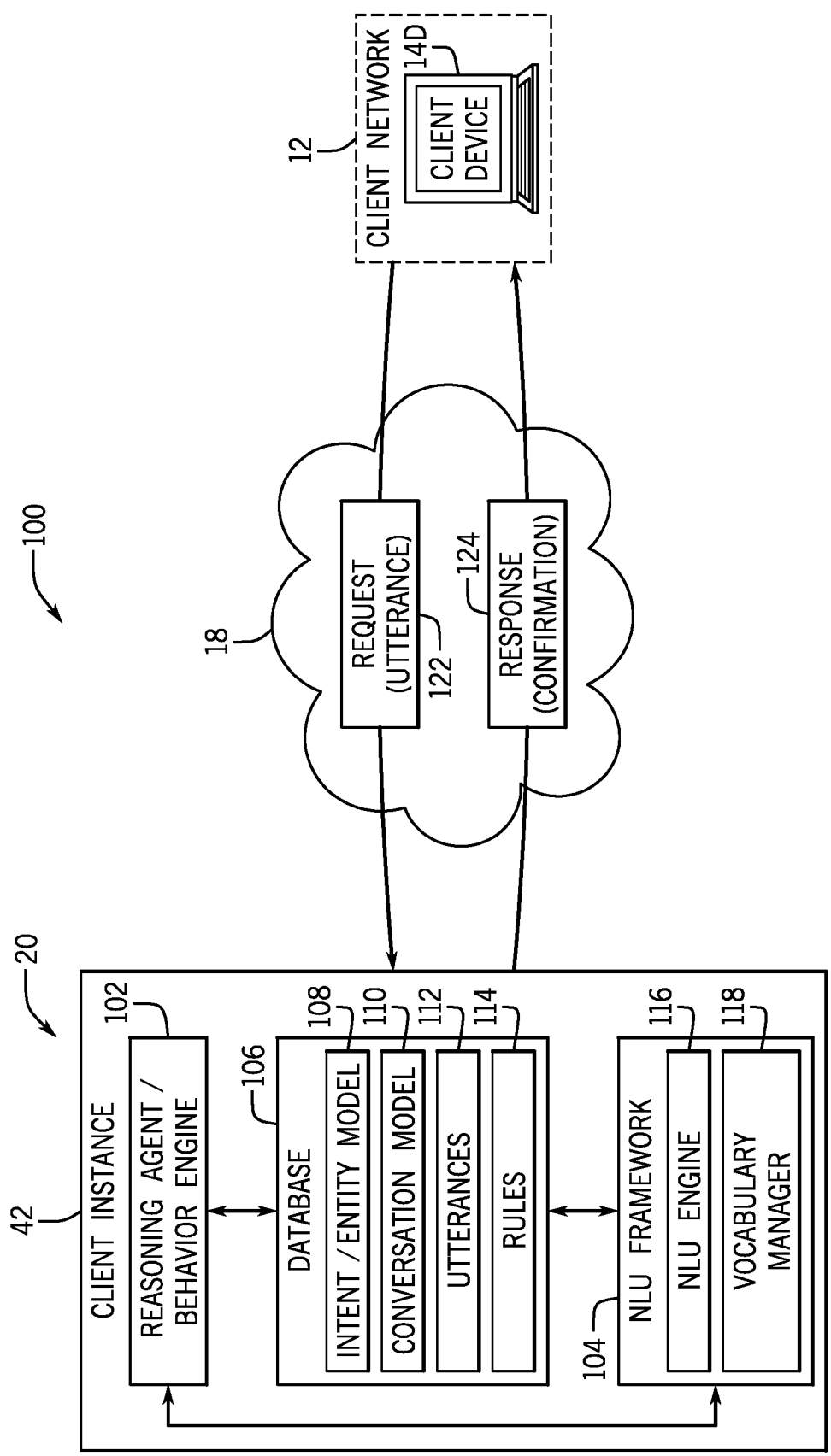
FIG. 4A is a schematic diagram illustrating an embodiment of an agent automation framework including a NLU framework that is part of a client instance hosted by the cloud computing system, in accordance with aspects of the present technique.

With the foregoing in mind, FIG. 4A illustrates an agent automation framework 100 (also referred to herein as an agent automation system 100) associated with a client instance 42, in accordance with embodiments of the present technique. More specifically, FIG. 4A illustrates an example of a portion of a service provider cloud infrastructure, including the cloud-based platform 20 discussed above. The cloud-based platform 20 is connected to a client device 14D via the network 18 to provide a user interface to network applications executing within the client instance 42 (e.g., via a web browser of the client device 14D). Client instance 42 is supported by virtual servers similar to those explained with respect to FIG. 2, and is illustrated here to show support for the disclosed functionality described herein within the client instance 42. The cloud provider infrastructure is generally configured to support a plurality of end-user devices, such as client device 14D, concurrently, wherein each end-user device is in communication with the single client instance 42. Also, the cloud provider infrastructure may be configured to support any number of client instances, such as client instance 42, concurrently, with each of the instances in communication with one or more end-user devices. As mentioned above, an end-user may also interface with client instance 42 using an application that is executed within a web browser.

The embodiment of the agent automation framework 100 illustrated in FIG. 4A includes a reasoning agent/behavior engine (RA/BE) 102, a NLU framework 104, and a database 106, which are communicatively coupled within the client instance 42. The RA/BE 102 may host or include any suitable number of virtual agents or personas that interact with the user of the client device 14D via natural language user requests 122 (also referred to herein as user utterances 122) and agent responses 124 (also referred to herein as agent utterances 124). It may be noted that, in actual implementations, the agent automation framework 100 may include a number of other suitable components, in accordance with the present disclosure.

For the embodiment illustrated in FIG. 4A, the database 106 may be a database server instance (e.g., database server instance 44A or 44B, as discussed with respect to FIG. 2), or a collection of database server instances. The illustrated database 106 stores an intent/entity model 108, a conversation model 110, a corpus of utterances 112, and a collection of rules 114 in one or more tables (e.g., relational database tables) of the database 106. The intent/entity model 108 stores associations or relationships between particular intents and particular sample utterances. In certain embodiments, the intent/entity model 108 may be authored by a designer using a suitable authoring tool. However, it should be noted that such intent/entity models typically include a limited number of sample utterances provided by the designer. Additionally, designers may have limited linguistic knowledge and, furthermore, are constrained from reasonably providing a comprehensive list of all possible ways of specifying intents in a domain. It is also presently recognized that, since the meaning associated with various intents and entities is continuously evolving within different contexts (e.g., different language evolutions per domain, per cultural setting, per client, and so forth), authored intent/entity models generally are manually updated over time. As such, it is recognized that authored intent/entity models are limited by the time and ability of the designer, and as such, these human-generated intent/entity models can be limited in both scope and functionality.

With this in mind, in certain embodiments, the intent/entity model 108 may instead be generated from the corpus of utterances 112 using techniques described in the commonly assigned, co-pending U.S. patent application Ser. No. 16/179,681, entitled, "METHOD AND SYSTEM FOR AUTOMATED INTENT MINING, CLASSIFICATION AND DISPOSITION," filed Nov. 2, 2018, which is incorporated by reference herein in its entirety for all purposes. More specifically, the intent/entity model 108 may be generated based on the corpus of utterances 112 and the collection of rules 114 stored in one or more tables of the database 106. It may be appreciated that the corpus of utterances 112 may include source data collected with respect to a particular context, such as chat logs between users and a help desk technician within a particular enterprise, from a particular group of users, communications collected from a particular window of time, and so forth. As such, the corpus of utterances 112 enable the agent automation framework 100 to build an understanding of intents and entities that appropriately correspond with the terminology and diction that may be particular to certain contexts and/or technical fields, as discussed in greater detail below.

For the embodiment illustrated in FIG. 4A, the conversation model 110 stores associations between intents of the intent/entity model 108 and particular responses and/or actions, which generally define the behavior of the RA/BE 102. In certain embodiments, at least a portion of the associations within the conversation model are manually created or predefined by a designer of the RA/BE 102 based on how the designer wants the RA/BE 102 to respond to particular identified intents/entities in processed utterances. It should be noted that, in different embodiments, the database 106 may include other database tables storing other information related to intent classification and response, in accordance with the present disclosure.

For the illustrated embodiment, the NLU framework 104 includes a NLU engine 116 and a vocabulary manager 118 (also referred to herein as a vocabulary subsystem). It may be appreciated that the NLU framework 104 may include any suitable number of other components. In certain embodiments, the NLU engine 116 is designed to perform a number of functions of the NLU framework 104, including generating word vectors (e.g., intent vectors, subject or entity vectors, subtree vectors) from word or phrases of utterances, as well as determining distances (e.g., Euclidean distances) between these vectors. For example, the NLU engine 116 is generally capable of producing a respective intent vector for each intent of an analyzed utterance. As such, a similarity measure or distance between two different utterances can be calculated using the respective intent vectors produced by the NLU engine 116 for the two intents, wherein the similarity measure provides an indication of similarity in meaning between the two intents.

The vocabulary manager 118 addresses out-of-vocabulary words and symbols that were not encountered by the NLU framework 104 during vocabulary training. For example, in certain embodiments, the vocabulary manager 118 can identify and replace synonyms and domain-specific meanings of words and acronyms within utterances analyzed by the agent automation framework 100 (e.g., based on the collection of rules 114), which can improve the performance of the NLU framework 104 to properly identify intents and entities within context-specific utterances. Additionally, to accommodate the tendency of natural language to adopt new usages for pre-existing words, in certain embodiments, the vocabulary manager 118 handles repurposing of words previously associated with other intents or entities based on a change in context. For example, the vocabulary manager 118 could handle a situation in which, in the context of utterances from a particular client instance and/or conversation channel, the word "bike" actually refers to a motorcycle rather than a bicycle.

Once the intent/entity model 108 and the conversation model 110 have been created, the agent automation framework 100 is designed to receive a user utterance 122 (in the form of a natural language request) and to appropriately take action to address request. For example, for the embodiment illustrated in FIG. 4A, the RA/BE 102 is a virtual agent that receives, via the network 18, the utterance 122 (e.g., a natural language request in a chat communication) submitted by the client device 14D disposed on the client network 12. The RA/BE 102 provides the utterance 122 to the NLU framework 104, and the NLU engine 116, along with the various subsystems of the NLU framework discussed below, processes the utterance 122 based on the intent/entity model 108 to derive intents/entities within the utterance. Based on the intents/entities derived by the NLU engine 116, as well as the associations within the conversation model 110, the RA/BE 102 performs one or more particular predefined actions. For the illustrated embodiment, the RA/BE 102 also provides a response 124 (e.g., a virtual agent utterance or confirmation) to the client device 14D via the network 18, for example, indicating actions performed by the RA/BE 102 in response to the received user utterance 122. Additionally, in certain embodiments, the utterance 122 may be added to the utterances 112 stored in the database 106 for continued learning within the NLU framework 104, as discussed below.

It may be appreciated that, in other embodiments, one or more components of the agent automation framework 100 and/or the NLU framework 104 may be otherwise arranged, situated, or hosted for improved performance. For example, in certain embodiments, one or more portions of the NLU framework 104 may be hosted by an instance (e.g., a shared instance, an enterprise instance) that is separate from, and communicatively coupled to, the client instance 42. It is presently recognized that such embodiments can advantageously reduce the size of the client instance 42, improving the efficiency of the cloud-based platform 20. In particular, in certain embodiments, one or more components of the semantic mining framework 130 discussed below may be hosted by a separate instance (e.g., an enterprise instance) that is communicatively coupled to the client instance 42, as well as other client instances, to enable semantic intent mining and generation of the intent/entity model 108.

Figure 4B:
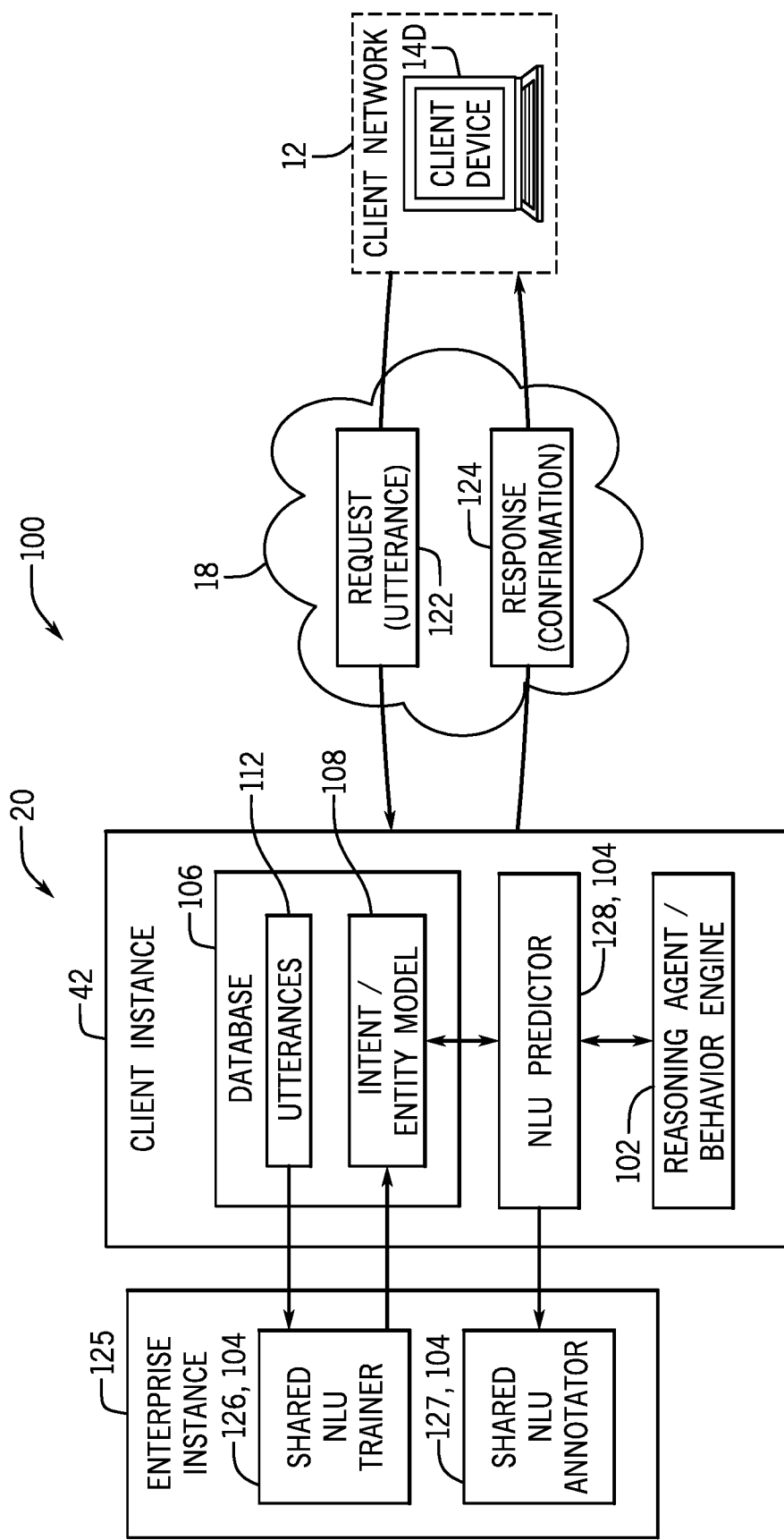
FIG. 4B is a schematic diagram illustrating an alternative embodiment of the agent automation framework in which portions of the NLU framework are part of an enterprise instance hosted by the cloud computing system, in accordance with aspects of the present technique.

With the foregoing in mind, FIG. 4B illustrates an alternative embodiment of the agent automation framework 100 in which portions of the NLU framework 104 are instead executed by a separate, shared instance (e.g., enterprise instance 125) that is hosted by the cloud computing system 20. The illustrated enterprise instance 125 is communicatively coupled to exchange data related to intent/entity mining and classification with any suitable number of client instances via a suitable protocol (e.g., via suitable Representational State Transfer (REST) requests/responses). As such, for the design illustrated in FIG. 4B, by hosting a portion of the NLU framework as a shared resource accessible to multiple client instances 42, the size of the client instance 42 can be substantially reduced (e.g., compared to the embodiment of the agent automation framework 100 illustrated in FIG. 4A) and the overall efficiency of the agent automation framework 100 can be improved.

In particular, the NLU framework 104 illustrated in FIG. 4B is divided into three distinct components that perform different aspects of semantic mining and intent classification within the NLU framework 104. These components include: a shared NLU trainer 126 hosted by the enterprise instance 125, a shared NLU annotator 127 hosted by the enterprise instance 125, and a NLU predictor 128 hosted by the client instance 42. It may be appreciated that the organizations illustrated in FIGS. 4A and 4B are merely examples, and in other embodiments, other organizations of the NLU framework 104 and/or the agent automation framework 100 may be used, in accordance with the present disclosure.

For the embodiment of the agent automation framework 100 illustrated in FIG. 4B, the shared NLU trainer 126 is designed to receive the corpus of utterances 112 from the client instance 42, and to perform semantic mining (e.g., including semantic parsing, grammar engineering, and so forth) to facilitate generation of the intent/entity model 108. Once the intent/entity model 108 has been generated, when the RA/BE 102 receives the user utterance 122 provided by the client device 14D, the NLU predictor 128 passes the utterance 122 and the intent/entity model 108 to the shared NLU annotator 127 for parsing and annotation of the utterance 122. The shared NLU annotator 127 performs semantic parsing, grammar engineering, and so forth, of the utterance 122 based on the intent/entity model 108 and returns annotated utterance trees of the utterance 122 to the NLU predictor 128 of client instance 42. The NLU predictor 128 then uses these annotated structures of the utterance 122, discussed below in greater detail, to identify matching intents and entities from the intent/entity model 108, such that the RA/BE 102 can perform one or more actions based on the identified intents. In certain embodiments, the NLU framework 104 may include features of the NLU framework described in co-pending U.S. patent application Ser. Nos. 16/238,324 and 16/238,331, both entitled "HYBRID LEARNING SYSTEM FOR NATURAL LANGUAGE UNDERSTANDING," filed Jan. 2, 2019, which are incorporated by reference herein in their entirety for all purposes.

Figure 5:
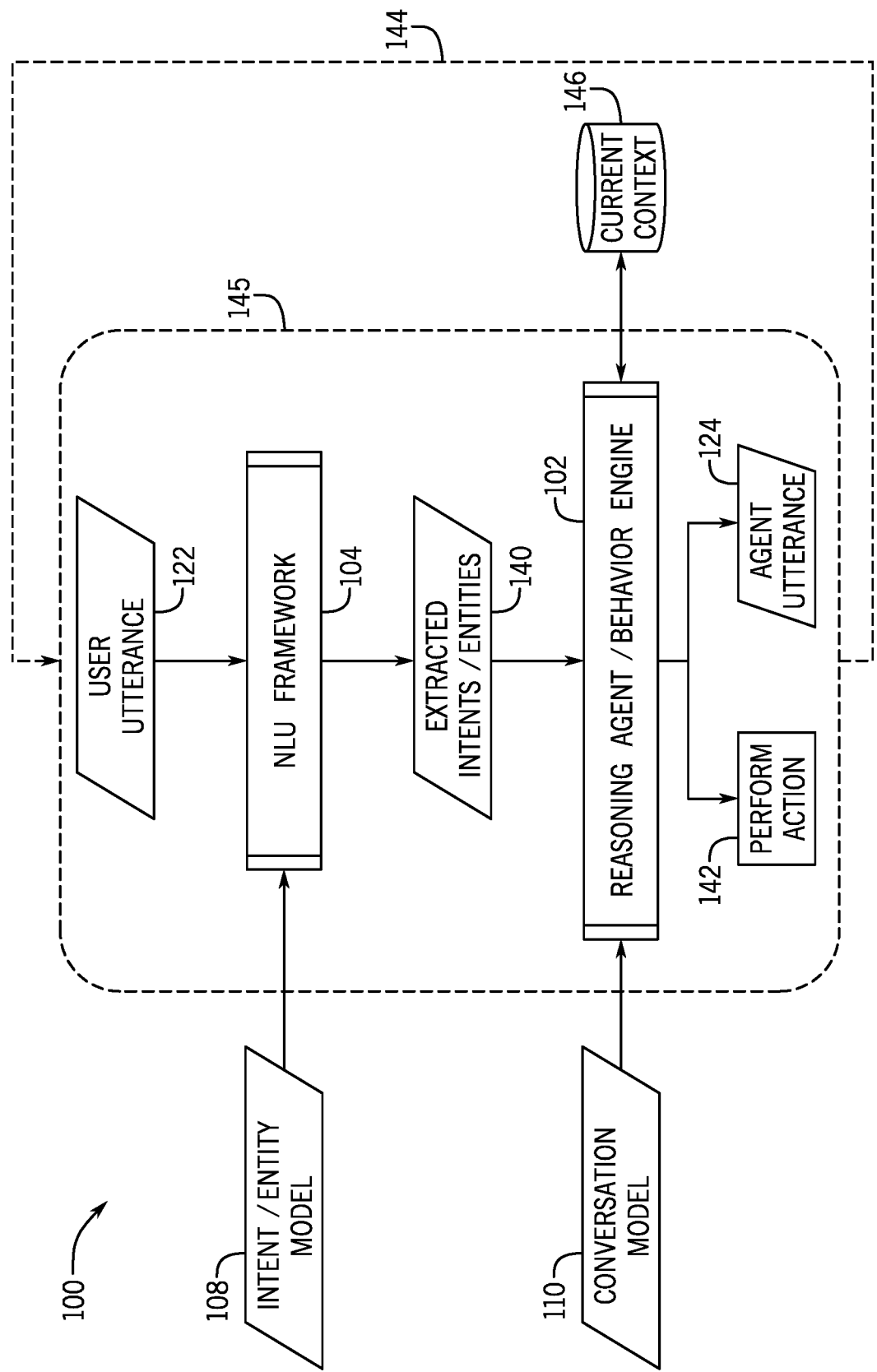
FIG. 5 is a flow diagram illustrating an embodiment of a process by which an agent automation framework, including an NLU framework and a Reasoning Agent/Behavior Engine (RA/BE), extracts intent/entities from and responds to a user utterance, in accordance with aspects of the present technique.

FIG. 5 is a flow diagram depicting the roles of the reasoning agent/behavior engine (RA/BE) 102 and NLU framework 104 within an embodiment of the agent automation framework 100. For the illustrated embodiment, the NLU framework 104 processes a received user utterance 122 to extract intents/entities 140 based on the intent/entity model 108. The extracted intents/entities 140 may be implemented as a collection of symbols that represent intents and entities of the user utterance 122 in a form that is consumable by the RA/BE 102. As such, these extracted intents/entities 140 are provided to the RA/BE 102, which processes the received intents/entities 140 based on the conversation model 110 to determine suitable actions 142 (e.g., changing a password, creating a record, purchasing an item, closing an account) and/or virtual agent utterances 124 in response to the received user utterance 122. As indicated by the arrow 144, the process 145 continuously repeats as the agent automation framework 100 receives and addresses additional user utterances 122 from the same user and/or other users in a conversational format.

As illustrated in FIG. 5, it may be appreciated that, in certain situations, no further action or communications may occur once the suitable actions 142 have been performed. Additionally, it should be noted that, while the user utterance 122 and the agent utterance 124 are discussed herein as being conveyed using a written conversational medium or channel (e.g., chat, email, ticketing system, text messages, forum posts), in other embodiments, voice-to-text and/or text-to-voice modules or plugins could be included to translate spoken user utterance 122 into text and/or translate text agent utterance 124 into speech to enable a voice interactive system, in accordance with the present disclosure. Furthermore, in certain embodiments, both the user utterance 122 and the virtual agent utterance 124 may be stored in the database 106 (e.g., in the corpus of utterances 112) to enable continued learning of context information within the agent automation framework 100.

Additionally, for the embodiment illustrated in FIG. 5, the RA/BE 102 of the agent automation system 100 uses information from a current context 146 to determine suitable responses to the extracted intents/entities 140. As mentioned, the current context 146 is a hierarchical set of parameters (e.g., name/value pairs) storing information that is potentially relevant to the current episode of dialog between the user and the virtual agent. The RA/BE 102 generally maintains the current context 146 for the current episode of dialog between the user and the virtual agent. For example, in certain situations, the performed actions 142 may include the RA/BE 102 updating the current context 146 for the current or on-going episode of the conversation based on the extracted intents/entities 140 received from the NLU framework 104. For example, the user utterance 122 may include a cue that references a previous episode of dialog between the user and the virtual agent, and, based on the extracted intents/entities 140 of the utterance, the RA/BE 102 can recall saved context information from the previous episode and update the current context 146 based on the saved context information 184.

Figure 6:
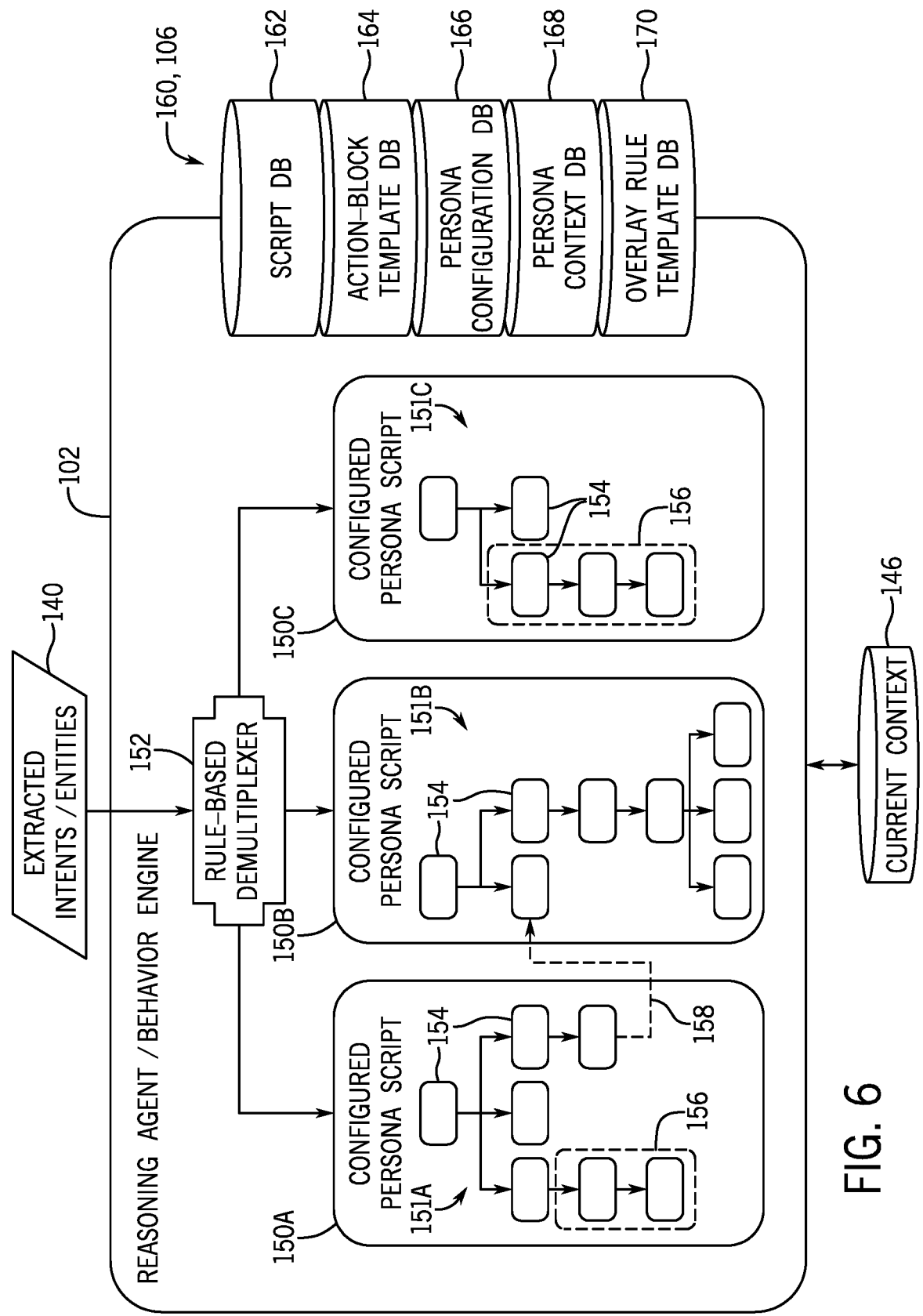
FIG. 6 is a block diagram illustrating an embodiment of the RA/BE that includes multiple personas, in accordance with aspects of the present technique.

FIG. 6 is a diagram of an example of a RA/BE 102 having multiple personas 150 (e.g., personas 150A, 150B, and 150C), in accordance with present embodiments. In certain embodiments, the RA/BE 102 may include any suitable number of different personas 150, each designed to address different aspects or facets of the RA/BE behavior, such as a sales persona, a marketing persona, a support persona, a persona for addressing requests during business hours, a persona for addressing requests after business hours, and so forth. As such, each of the personas 150 can encapsulate different expertise and knowledge the RA/BE 102 exhibits. Each of these personas 150 is designed to perform predetermined actions in response to receiving particular intent/entities 140, based on the current context 146. In particular, these personas 150 direct how conversations flow, what actions the RA/BE 102 is to take, what responses the RA/BE 102 is to provide, and so on. Additionally, as discussed below, these personas 150 are capable of updating the current context 146 of the current episode in response to particular cues in the extracted intents/entities 140.

For the embodiment illustrated in FIG. 6, the intents/entities 140 of the user utterance 122 extracted by the NLU framework 104 are sent to a rule-based demultiplexer 152 of the RA/BE 102. The demultiplexer 152 uses rules (e.g., rules 114 stored in the database 106 illustrated in FIG. 4A) to select which of personas 150 (e.g., persona 150A, 150B, and/or 150C) to send the extracted intent/entities 140 of the utterance for handling. In certain embodiments, these rules 114 can be based on incoming intent affinity (e.g., last persona to handle the user utterance is preferentially selected), based on arrival time of the user utterance 122 (e.g., during business hours, after business hours), and so forth.

The personas 150 of the RA/BE 102 include scripts 151 (e.g., scripts 151A, 151B, and 151C) that model aspects of the behavior of the RA/BE 102. The personas 150 also include configuration items for each of the scripts 151 (e.g., downstream services to which the scripts eventually call out). For the illustrated embodiment, the scripts 151 of the personas 150 include actions 154 and action blocks 156, wherein actions 154 reflect actions that a script can take (e.g., display a message with button choice, wait for a few seconds, invoke the weather service to check the current weather, etc.) and action blocks 156 are collections of actions 154 combined into a templated flow. As such, action blocks 156 can be used to capture oft-repeated/oft-used flows/behaviors to reduce the cost and effort of persona development. Additionally, as illustrated, certain actions 154 can include a cross-persona invocation 158, whereby persona 150A (e.g., a sales agent persona) directly invokes persona 150B (e.g., a support persona) to hand-off the dialog to another persona.

It may be appreciated that the RA/BE 102 may store and retrieve data from any suitable number of tables or databases to enable the episodic context functionality set forth herein. For the embodiment illustrated in FIG. 6, for example, the RA/BE 102 is communicatively coupled to a number of databases 160 that may be stored as databases or tables within the database 106 of FIG. 4A. In particular, these databases 160 include a script database 162 that stores the scripts (e.g., flows, sets of instructions) for the configured personas 150, an action-block template database 164 that stores action-block templates that can be instantiated to add action blocks 156 to the personas 150, and a persona configuration database 166 that stores other information regarding the configuration of the personas 150. These databases 160 also include a persona context database 168 in which personas 150 store locally managed frames, and an overlay rule template database 170 storing rules for how the context of other episodes overlay the current context to generate an updated current context, as discussed below.

Figure 7:
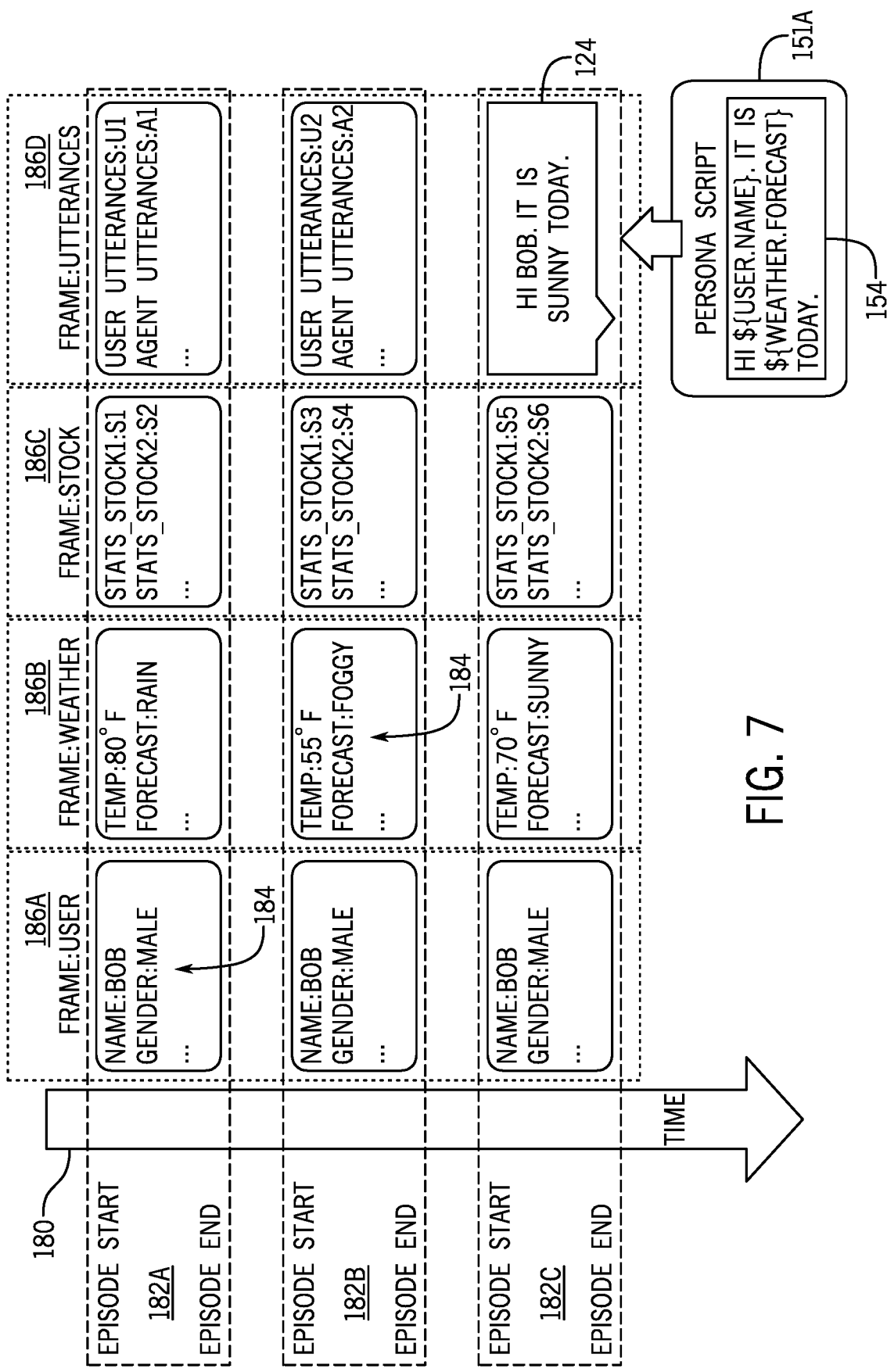
FIG. 7 is a diagram illustrating episodic context in conjunction with an agent utterance generated by the RA/BE, in accordance with aspects of the present technique.

FIG. 7 is a diagram illustrating an example of episodic context in conjunction with an agent utterance 124 generated by an embodiment of a persona (e.g., persona 150A) of the RA/BE 102. That is, for the illustrated example, episodic context is managed and used by a particular persona (e.g., persona 150A) of the RA/BE 102. The illustrated example includes a timeline 180 representing an on-going conversation between a user and the persona 150A of the RA/BE 102. The RA/BE 102 segments the conversation into episodes 182, including episodes 182A, 182B, and 182C, which represent discrete and disparate segments pertinent to a specific topic/set of topics during one-on-one or group interactions involving the RA/BE 102. Each of the episodes 182 includes respective boundaries to mark start and end times that are determined as the conversation progresses. To identify these boundaries, rules and statistical learning (e.g., machine-learning) techniques are used to apply context aggregation.

For example, in certain embodiments, the RA/BE 102 determines the start and end time associated with each of the episodes 182 based on changes in topic, based on a substantially delay between utterances, or other suitable factors. Specifically, heuristic rules (e.g., based on time or based on judgements conferred by a downstream prosody subsystem) may be used to identify episode start and end times. Learning mechanisms, similar to human autonoetic introspection, can be used to determine approximations of attention span, identify what context information 184 needs to be propagated across episode boundaries, determine property-override-rules, determine derivative scoping rules, and so forth, and these, in turn, use features of the user (e.g., user demographic, user mood, and so forth) alongside current relevant context (e.g., current time-of-day, location, weather, and so forth).

For the embodiment illustrated in FIG. 7, each of the episodes 182 contains context information 184 (e.g., a hierarchical set of name/value pairs) stored in different dimensions or frames 186 of the episode. It may be appreciated that these frames 186 generally simulate a cognitive "frame of reference," although from the singular point of view of the RA/BE 102. For the illustrated embodiment, the frames 186 include a user frame 186A, a weather frame 186B, a stock frame 186C, and an utterance frame 186D. These different frames 186 store different context information 184 to enable the RA/BE 102 to have a richer view of the world. As discussed in greater detail with respect to FIG. 8, the context information 184 stored within each of the frames 186 may have been captured as part of a local conversation, extracted from external sources (e.g., an application programming interface (API) call to an external weather service), or imparted by another persona of the RA/BE 102.

It should be appreciated that each piece of context information 184 is suitably scoped such that the information is only available to particular personas 150, action blocks 156, and actions 154 based on certain conditions. For example, the context information 184 may be scoped using one or more of: temporal scoping, execution scoping, component-type scoping, and aspect-level scoping. For example, with temporal scoping, certain context information 184 may be recalled and used for the respective episode only (e.g., airline flight destination information), while other context information may be recalled and used during all conversations with a particular user (e.g., the user's name, gender, etc.). With execution scoping, certain context information 184 may only be recalled and used within the same persona 150 (e.g., the same script 151), the same action block 156, and/or the same action 154. With component-type scoping, context information 184 may be recalled and used within personas 150, the action blocks 156, and/or actions 154 having a particular type (e.g., "support desk"-type personas 150, "entity-completion" type action blocks 156). With aspect-level scoping, security roles of the user that generated the user utterance 122 and the persona 150 can be introspected (e.g., in an access control list (ACL)), and only certain context information 184 may be recalled and used based on the rights or privileges associated with these security roles. As such, when a persona 150 retrieves episode context information 184, the persona 150 may retrieve only a temporal scoped portion, an execution scoped portion, a component-type scoped portion, and/or an aspect-level scoped portion of the episode context from the persona context database 168.

For the example illustrated in FIG. 7, during episode 182C, the persona 150A of the RA/BE 102 has received a user utterance 122 from the user that simply includes a greeting (e.g., "Hello."). As discussed with respect to FIG. 5, the NLU framework 104 extracts the intents/entities 140 from the user utterance 122 and delivers these to the RA/BE 102. The persona 150A of the RA/BE 102 receives the extracted intents/entities 140 from the NLU framework 104, which are indicative of a greeting intent. Accordingly, the script 151A of the persona 150A executes action blocks 156 and/or actions 154 in response to the received intents/entities 140 of the user utterance 122 and the current context 146, which, for this example, initially only contains context information 184 associated with the current episode 182C.

In particular, for the example illustrated in FIG. 7, the script 151A includes an action block 154 having instructions to generate the agent utterance 124 in response to the received greeting based on the current context 146. As such, by referencing context information 184 from the user frame 186A and in the weather frame 186B, the action block 154 is able to generate a context-based response to the user utterance 122. In other examples, the persona 150A may perform actions 154 (e.g., generate agent utterance 124) using other context information 184, such as information related to the performance of particular stocks during episode 182A from the stock frame 186C, or information from user utterances collected during episode 182B from the utterance frame 186D, when responding to the extracted intents/entities 140.

Figure 8:
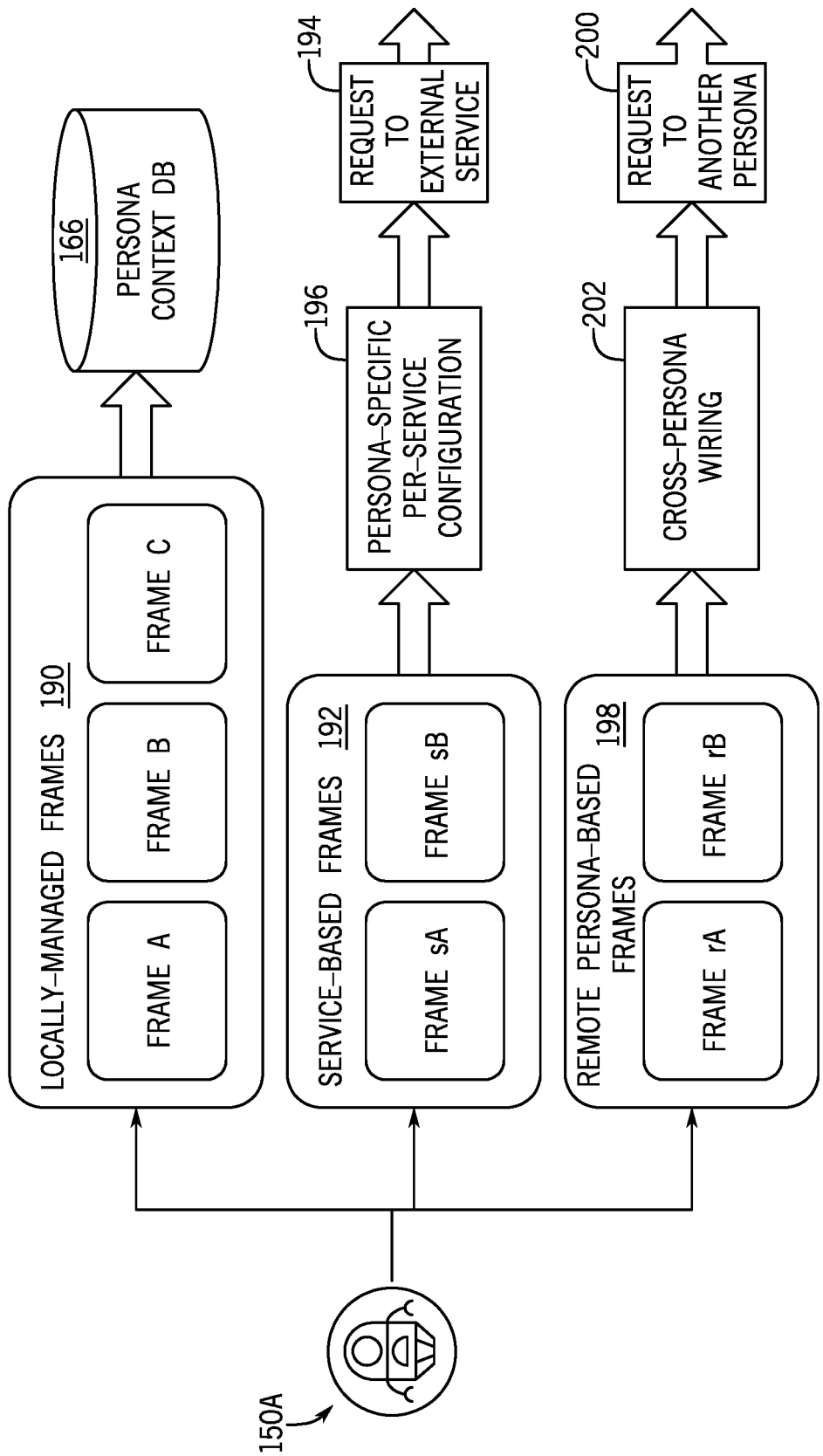
FIG. 8 is a diagram depicting examples of various frame types that can be utilized by a persona of the RA/BE, in accordance with aspects of the present technique.

FIG. 8 is a diagram depicting examples of different types of frames 186 that can be utilized by the RA/BE 102 in certain embodiments. For the illustrated example, the frame types include local frames 190, which are stored and managed by each of the personas 150 in the aforementioned persona context database 168. These local frames 190 may include any information generated during an episode of the conversation, including, for example, user information, discussion topic information, actions performed, utterances exchanged, and so forth. The illustrated example also includes service-based frames 192, which are designed to retrieve or mine context information 184 from an external service/source via a service call out 194 based on person-specific configuration settings 196 (e.g., Uniform Resource Locator (URL) of the service, credentials, and so forth) that are defined in the persona configuration database 166 illustrated in FIG. 6. For example, in certain embodiments, service-based frames may include weather frames that call out to an external weather service, as configured at the persona-level, for weather information. Other example service-based frames may include available merchandise frames that call out to a retailer's service to retrieve a list of available merchandise. Similar service-based frames may include service call outs or requests to stock services, news services, and so forth.

Additionally, the illustrated example also includes remote persona-based frames 198 (also known as consultation frames or cross-persona frames). These remote persona-based frames involve one persona (e.g., persona 150A) consulting another persona's knowledge base (e.g., the locally managed frames 190 of persona 150C) for reference using a request 200 to the persona based on cross-persona wiring 202. The cross-persona wiring 202, which may be defined in the scripts 151 and/or the persona configuration database 166 illustrated in FIG. 6, defines how the personas 150 exchange the context information 184.

Figure 9A:
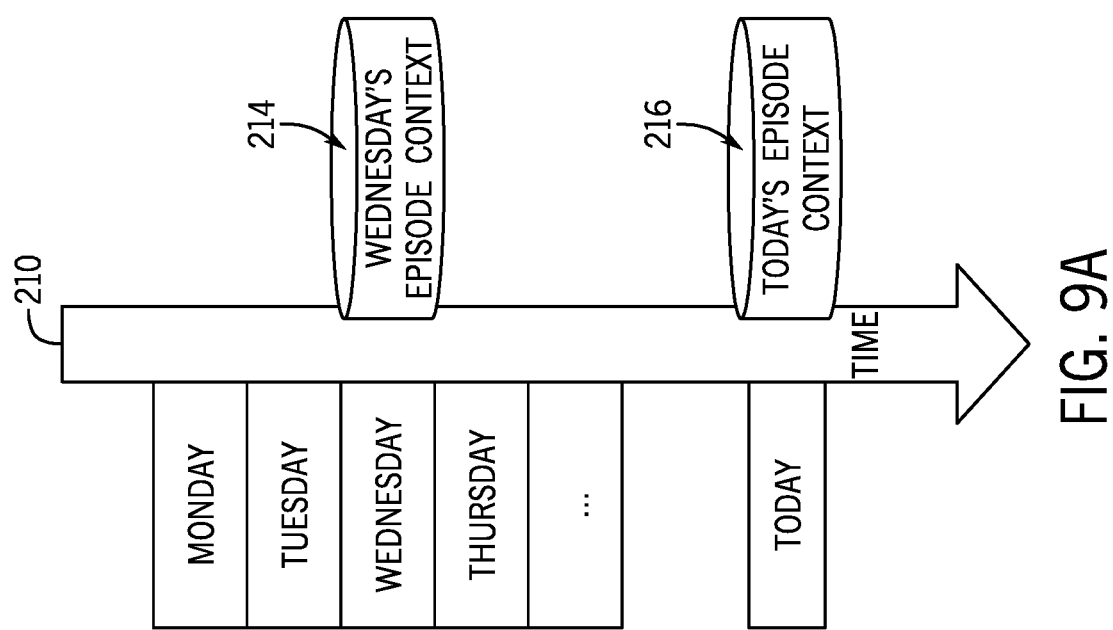
FIG. 9A is a timeline and FIG. 9B is a flow diagram illustrating an embodiment of an episodic context recall process, in accordance with aspects of the present technique.
Figure 9B:
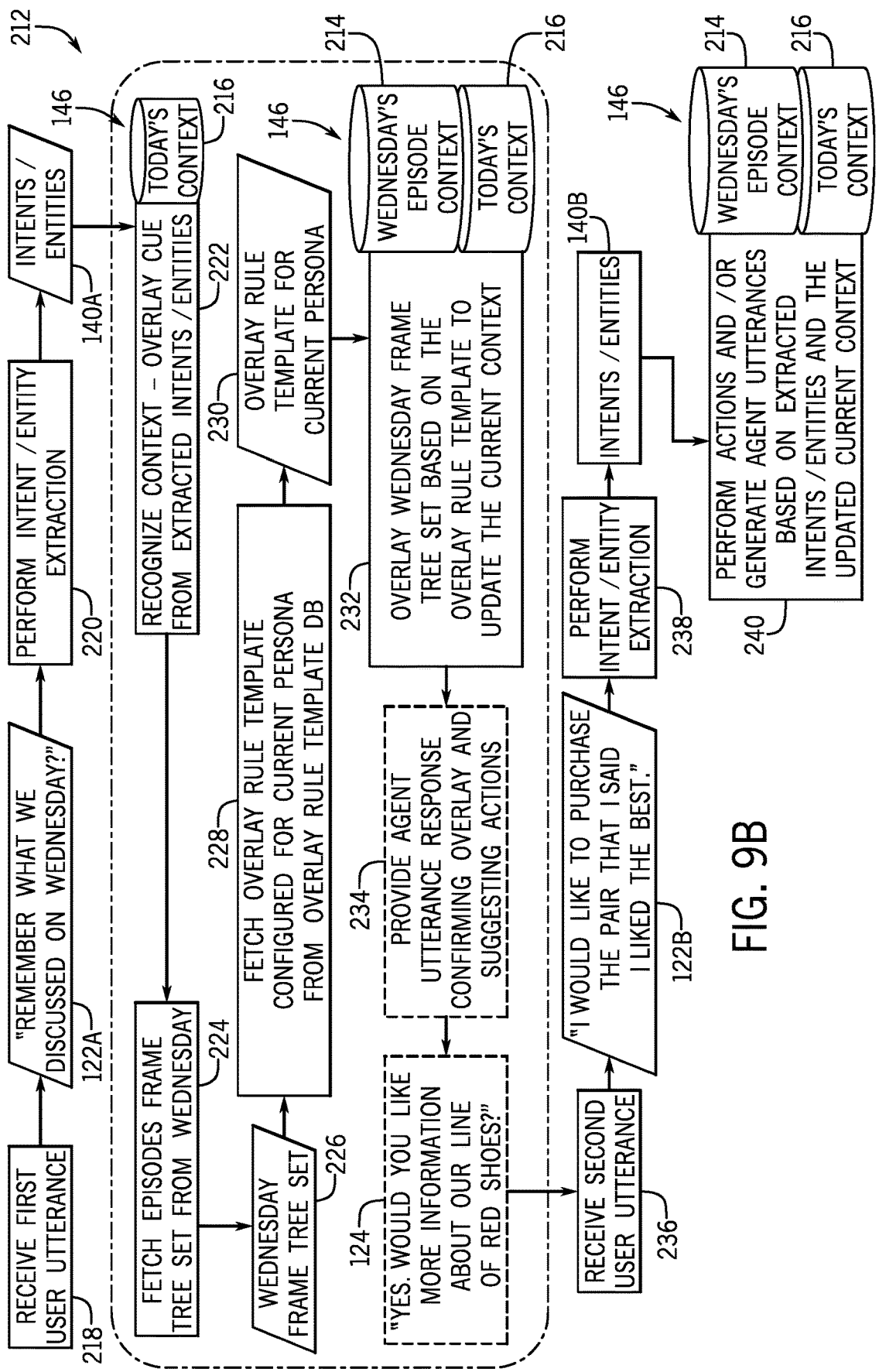

FIG. 9A is a timeline 210 and FIG. 9B is a corresponding flow diagram illustrating an embodiment of an episodic context recall process 212, in accordance with aspects of the present technique. The illustrated process 212 may be executed as part of one or more components (e.g., the NLU framework 104, the RA/BE 102) of the agent automation system 100. For this example, as illustrated by the timeline 210, there is only one episode of context information 184 stored for each day of conversation between a user and a virtual agent associated with the RA/BE 102. In particular, a first episode of the conversation was captured and stored as Wednesday's episode context 214. Additionally, for this example, the context information 184 associated with the current episode (e.g., Today) is labeled as Today's episode context 216. Both of these contexts 214 and 216 may include locally managed frames 190, service-based frames 192, and/or remote persona-based frames 198 storing context information 184, as discussed above with respect to FIG. 8. It may be appreciated that the process 212 illustrated in FIG. 9B is merely provided as an example and, in other embodiments, the process 212 may include additional steps, fewer steps, repeated steps, and so forth, in accordance with the present disclosure.

Moving to the process 212 illustrated in FIG. 9B, the example begins with the agent automation system 100 receiving (block 218) a first user utterance 122A. For this example, the first user utterance 122A includes the query, "Remember what we discussed on Wednesday?" As discussed above with respect to FIG. 5, the NLU framework 104 performs intent/entity extraction (block 220) to extract a first set of intents/entities 140A from the first user utterance 122A, which are passed to one of the personas (e.g., script 151A of persona 150A) of the RA/BE 102 for handling.

For the embodiment illustrated in FIG. 9B, the process 212 continues with the persona 150A recognizing (block 222) a context overlay cue from the extracted intents/entities 140A. In response, the persona 150A retrieves (block 224) Wednesday's episode context 214 illustrated in FIG. 9A as an episode frame tree set 226. That is, for this example, Wednesday's episode context 214 is retrieved as a tree data structure that includes one or more frames 186 storing different context information 184 as parameters (e.g., name/value pairs). Additionally, the persona 150A retrieves (block 228), from the overlay rule template database 170, a persona-specific overlay rule template 230. Then, as illustrated in FIG. 9B, the persona 150A overlays (block 232) its current context 146, in this case Today's episode context 216, with the episode frame tree set 226 associated with Wednesday's episode context 214, based on the contents of the overlay rule template 230.

The overlay rule template 230 generally defines how the context information 184 of an episode is overlaid with the current context information. For example, in certain embodiments, the overlay rule template 230 may include rules indicating that, when the overlaying context includes a parameter already defined in the current context information, the value indicated in the overlaying context either overrides the original value, and is therefore preferentially used under certain circumstances. In other embodiments, the overlay rule template 230 may include rules indicating that the value indicated in the overlaying context overwrites (e.g., replaces) the value in the current context 146. In certain embodiments, certain frames 186 or particular parameter values may override, while others overwrite, the value in the current context 146.

After updating the current context 146, for the embodiment illustrated in FIG. 9B, the process 212 includes the personas 150A of the RA/BE 102 providing (block 234) an agent utterance 124 in response to the initial user utterance 122 confirming overlay and suggesting actions. For the embodiment illustrated, the persona 150 includes one or more actions 154 that generate the agent utterance 124, "Yes. Would you like more information about our line of red shoes?" As such, for the illustrated embodiment, the updated current context 146 may be used by the RA/BE 102 to generate the agent utterance 124 confirming that the RA/BE 102 was able to successfully retrieve and overlay the requested episode context. In other embodiments, block 234 may be skipped and the RA/BE 102 may not respond by generating the agent utterance 124 and instead may wait until another user utterance is received before using the updated current context to generate an action.

For the embodiment illustrated in FIG. 9B, the process 212 continues with the RA/BE 102 receiving (block 236) a second user utterance 122B from the user as part of the current episode of the conversation between the user and the persona 150A of the RA/BE 102. For this example, the second user utterance 122B includes the statement, "I would like to purchase the pair that I said I liked the best." As discussed above, the NLU framework 104 performs intent/entity extraction (block 238) to extract a second set of intents/entities 140B from the second user utterance 122B, which are passed to the persona 150A of the RA/BE 102 for handling.

For the embodiment illustrated in FIG. 9B, the process 212 concludes with the RA/BE 102 performing actions (block 240) based on the intent/entities 140B extracted in block 238 and the current context 146 that was updated in block 232. In particular, for the embodiment illustrated in FIG. 9B, the current context 146 is illustrated as being a combination of Today's episode context 216 that is overlaid with Wednesday's Episode Context 214. As such, when the RA/BE 102 receives the extracted intents/entities from the second user utterance 122B, the RA/BE 102 responds based on the updated current context 146. That is, for this example, the RA/BE 102 determines that the user intends to purchase a particular pair of shoes based on the context information 184 stored and retrieved as part of Wednesday's Episode Context 214. As such, the RA/BE 102 is able to correctly identify the entity (e.g., the pair of red shoes) that the user intends to purchase using the updated current context 146 of the RA/BE 102.

Figure 10A:
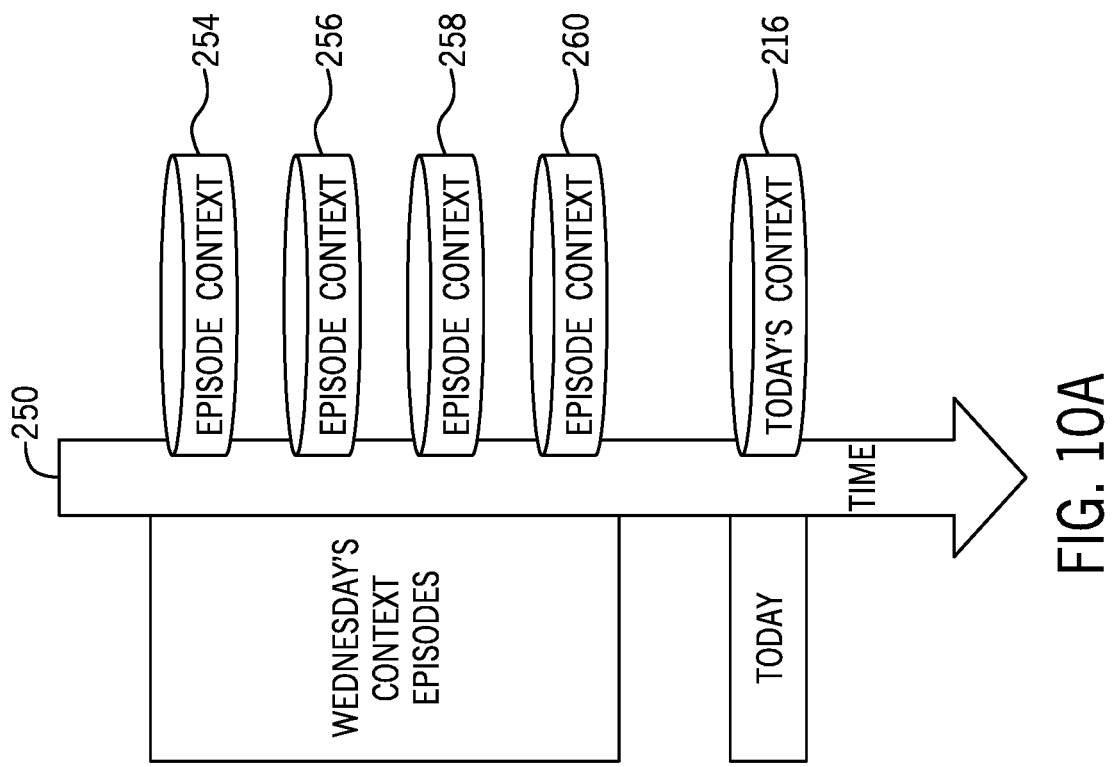
FIG. 10A is a timeline and FIG. 10B is a flow diagram illustrating an embodiment of an episodic context recall process that includes episode aggregation, in accordance with aspects of the present technique.
Figure 10B:
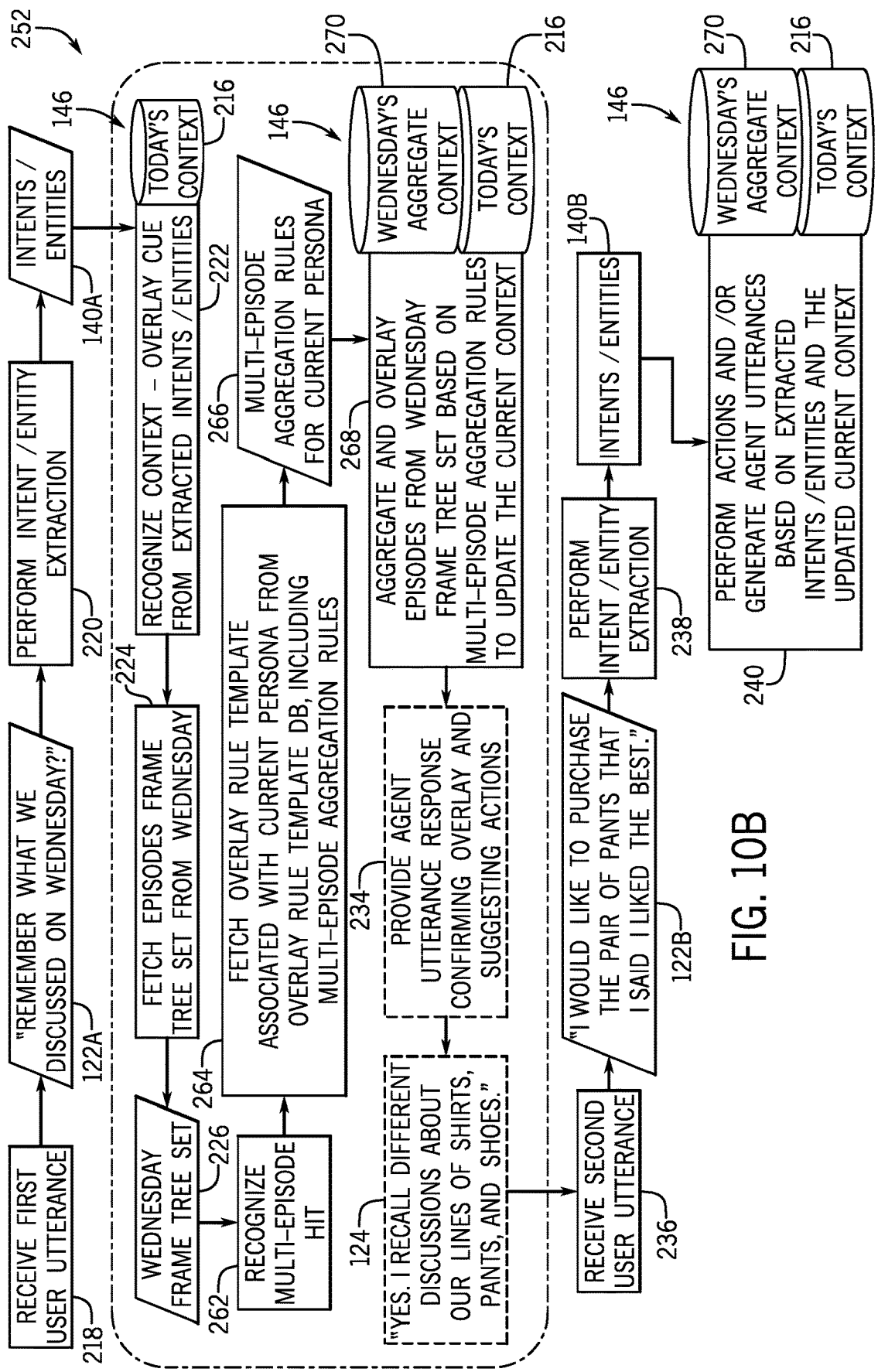

It may be appreciated that the context information 184 can be aggregated at different time granularities, such as at a single episode level, as illustrated in the example of FIGS. 9A and 9B, or over several episodes occurring in a defined period of time (e.g., a day, week, month, etc.). For example, FIG. 10A is a timeline 250 and FIG. 10B is a corresponding flow diagram illustrating an embodiment of an episodic context recall process 252 that includes episode aggregation, in accordance with aspects of the present technique. The process 252 may be executed as part of one or more components (e.g., the NLU framework 104, the RA/BE 102) of the agent automation system 100. For this example, as illustrated by the timeline 250, there are multiple episodes of context information 184, including episode contexts 254, 256, 258, and 260, stored based on a day of conversation between a user and a virtual agent associated with the RA/BE 102. Additionally, for this example, the context information 184 associated with the current episode (e.g., today) is labeled as Today's episode context 216. The contexts 254, 256, 258, and 260 may include locally managed frames 190, service-based frames 192, and/or remote persona-based frames 198 storing context information 184, as discussed above with respect to FIG. 8. It may be appreciated that the process 252 illustrated in FIG. 10B is merely provided as an example and, in other embodiments, the process 252 may include additional steps, fewer steps, repeated steps, and so forth, in accordance with the present disclosure.

Moving to the process 252 illustrated in FIG. 10B, the example begins like the example of FIGS. 9A and 9B, with the agent automation system 100 receiving (block 218) the first user utterance 122A, and the NLU framework 104 performing intent/entity extraction (block 220) to extract intents/entities 140A from the first user utterance 122A. These intents/entities 140A are passed to one of the personas (e.g., script 151A of persona 150A) of the RA/BE 102 for processing, wherein the persona 150A recognizes (block 222) the context overlay cue from the extracted intents/entities 140A. In response, the persona 150A retrieves (block 224) Wednesday's episode context (e.g., episode contexts 254, 256, 258, and 260) as a frame tree set 226.

As such, the persona 150 recognizes (block 262) that the retrieved frame tree set 226 includes multiple episodes, and in response, retrieves (block 264), from the overlay rule template database 170, a persona-specific overlay rule template 266, including multi-episode aggregation rules. Then, as illustrated in FIG. 10B, the persona 150A aggregates (block 268) the context information 184 of the episodes contexts 254, 256, 258, and 260 based on the multi-episode aggregation rules to generate aggregate context 270, and then overlays the current context 146 (in this case Today's episode context 216) with the aggregate context 270, based on the contents of the overlay rule template 230.

The multi-episode aggregation rules of the overlay rule template 230 generally defines how the context information 184 of several episodes is aggregated. In certain embodiments, the multi-episode aggregation rules may include rules indicating how to deal with situations in which the context of multiple episodes includes different values for a parameter of the context information 184. For example, in certain embodiments, the values indicated in the context information 184 of particular episodes (e.g., longer episodes, more recent episodes, episodes believed to be more relevant) may take precedent and provide the particular value to the aggregate context 270.

After updating the current context 146, for the embodiment illustrated in FIG. 10B, the process 252 includes the personas 150A of the RA/BE 102 providing (block 234) an agent utterance 124 in response to the initial user utterance 122 confirming overlay and suggesting actions. For the embodiment illustrated, the persona 150 includes one or more actions 154 that generate the agent utterance 124, "Yes. I recall different discussions about our lines of shirts, pants, and shoes." As such, for the illustrated embodiment, the updated current context 146 may be used by the RA/BE 102 to generate the agent utterance 124 confirming that the RA/BE 102 was able to successfully retrieve and overlay the requested episode context, and to prompt the user to provide greater clarity as to the overall intentions of the user. In other embodiments, block 234 may be skipped and the RA/BE 102 may not respond by generating the agent utterance 124 and instead may wait until another user utterance is received before using the updated current context to perform an action.

For the embodiment illustrated in FIG. 10B, the process 252 continues with the RA/BE 102 receiving (block 236) a second user utterance 122B from the user as part of the current episode of the conversation between the user and the persona 150A of the RA/BE 102. For this example, the second user utterance 122B includes the statement, "I would like to purchase the pair of pants that I said I liked the best." As discussed above, the NLU framework 104 performs intent/entity extraction (block 238) to extract a second set of intents/entities 140B from the second user utterance 122B, which are passed to the persona 150A of the RA/BE 102 to perform actions based on these intents/entities 140B.

For the embodiment illustrated in FIG. 10B, the process 252 concludes with the RA/BE 102 performing actions (block 240) based on the intent/entities 140B extracted in block 238 and the current context 146 that was updated in block 268. In particular, for the embodiment illustrated in FIG. 10B, the current context 146 is illustrated as being a Today's episode context 216 overlaid with the aggregate context 270. As such, when the RA/BE 102 receives the extracted intents/entities from the second user utterance 122B, the RA/BE 102 responds based on the updated current context 146. That is, for this example, the RA/BE 102 determines that the user intends to purchase a particular pair of pants based on the context information 184 stored and retrieved as part of Wednesday's aggregate context 270. As such, the persona 150A of the RA/BE 102 is able to correctly identify the entity (e.g., the pair of pants) that the user intends to purchase using the updated current context 146.

Technical effects of the present disclosure include providing an agent automation framework that is capable of extracting meaning from user utterances, such as requests received by a virtual agent (e.g., a chat agent), and suitably responding to these user utterances. Additionally, present embodiments enable a Reasoning Agents/Behavior Engine (RA/BE) having one or more personas that implement an episodic context technique to maintain a current context that is used to perform suitable tasks in response to a user utterance. The RA/BE may include a number of different personas, each designed to address different aspects or facets of the RA/BE behavior. Additionally, these personas are configured to update the current context of an on-going episode based on information associate with frames of other conversational episodes between the user and virtual agent. In particular, a persona of the RA/BE may access and utilize context information from different types of frames, including frames locally managed, service-based frames, and remote persona-based frames. In particular, the disclosed agent automation system is capable of detecting user utterance cues that references context information associated with one or more episodes, and is capable of updating the context of the current episode with the context of the referenced episodes based on persona-specific overlay rule templates. As such, the persona of the RA/BE can subsequently perform suitable actions in response to the user utterance in a context-appropriate manner. Accordingly, the disclosed RA/BE design provides a substantial improvement by enabling virtual agents having automatic episodic context management.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An agent automation system, comprising:
a memory configured to store a reasoning agent/behavior engine (RA/BE) comprising a first persona, a current context, and a demultiplexer; and
a processor configured to execute instructions of the RA/BE to cause the first persona to perform actions comprising:
receiving intents/entities of a first user utterance, wherein the demultiplexer is configured to provide the intents/entities of the first user utterance to the first persona of the RA/BE, or another persona of the RA/BE, based on one or more stored rules;
recognizing a context overlay cue in the intents/entities of the first user utterance, wherein the context overlay cue defines a time period;
retrieving an episode frame tree set based on the time period;
retrieving an overlay rule template for the first persona of the RA/BE;
updating the current context of the RA/BE by overlaying the episode frame tree set based on the overlay rule template; and
performing at least one action based on the intents/entities of the first user utterance and the current context of the RA/BE.

2. The system of claim 1, wherein, to retrieve the episode frame tree set, the processor is configured to execute instructions of the RA/BE to cause the first persona to perform actions comprising:
retrieving a service-based frame of the episode frame tree set, wherein the service-based frame includes information retrieved from an external service.

3. The system of claim 1, wherein the RA/BE comprises a second persona, and wherein, to retrieve the episode frame tree set, the processor is configured to execute instructions of the RA/BE to cause the first persona to perform actions comprising:
retrieving a remote persona-based frame of the episode frame tree set, wherein the remote persona-based frame includes information retrieved from the second persona.

4. The system of claim 1, wherein, to update the current context, the processor is configured to execute instructions of the RA/BE to cause the first persona to perform actions comprising:
retrieving a plurality of episode frame tree sets based on the time period;
aggregating the plurality of episode frame tree sets based on multi-episode aggregation rules of the overlay rule template to generate an aggregate context; and
updating the current context of the RA/BE by overlaying the aggregate context based on the overlay rule template.

5. The system of claim 1, wherein the processor is configured to execute instructions of the RA/BE to cause the first persona to perform actions comprising:
receiving intents/entities of a second user utterance; and
performing another at least one action based on the intents/entities of the second user utterance and the current context of the RA/BE.

6. The system of claim 1, wherein the memory is configured to store a persona context database that includes the episode frame tree set, wherein the episode frame tree set includes an episode start time, and an episode end time, and a plurality of frames that each include a plurality of parameters.

7. The system of claim 6, wherein the episode start time and the episode end time are determined heuristically based on a change in topic or a delay in communication.

8. The system of claim 6, wherein the processor is configured to execute instructions of the RA/BE to cause the first persona to perform actions comprising:

identifying the episode frame tree set associated with the time period based on the episode start time and the episode end time of the episode frame tree set.

9. The system of claim 1, wherein the actions comprise actions defined within a script associated with the first persona of the RA/BE.

10. The system of claim 1, wherein the actions comprise action blocks defined within a script associated with the first persona of the RA/BE.

11. The system of claim 1, wherein the actions comprise a cross-persona invocation requesting another persona of the RA/BE to perform other actions.

12. A method of operating a reasoning agent/behavior engine (RA/BE) of an agent automation system, comprising:
generating an episode frame tree set based on previously received user utterances and storing the episode frame tree set in a persona context database, wherein the episode frame tree set comprises an episode start time and an episode end time that are heuristically determined from the previously received user utterances;
receiving intents/entities of a user utterance;
recognizing a context overlay cue in the intents/entities of the user utterance, wherein the context overlay cue defines a time period;
retrieving the episode frame tree set from the persona context database based on the time period;
retrieving an overlay rule template from an overlay rule template database of the RA/BE;
updating a current context of the RA/BE by overlaying the episode frame tree set based on the overlay rule template; and
performing actions in response to the received user utterance based on the current context of the RA/BE.

13. The method of claim 12, wherein retrieving the episode frame tree set comprises:
retrieving a plurality of episode frame tree sets, including the episode frame tree set, from the persona context database based on the time period.

14. The method of claim 13, wherein updating the current context of the RA/BE comprises:
aggregating the plurality of overlaying the episode frame tree sets to generate an aggregate context based one or more multi-episode aggregation rules of the overlay rule template; and
updating the current context of the RA/BE by overlaying the aggregate context based on the overlay rule template.

15. A non-transitory, computer-readable medium storing instructions of an agent automation system executable by one or more processors of a computing system, wherein the instructions comprise:
instructions to receive intents/entities of a user utterance;
instructions to recognize a context overlay cue in the intents/entities of the user utterance, wherein the context overlay cue defines a time period;
instructions to retrieve an episode frame tree set from a persona context database based on the time period, wherein the episode frame tree set includes an episode start time, and an episode end time, and a plurality of frames that each include a plurality of parameters;
instructions to retrieve an overlay rule template from an overlay rule template database associated with the agent automation system;
instructions to update a current context by overlaying the episode frame tree set based on the overlay rule template; and
instructions to perform actions in response to the intents/entities of the user utterance based on the current context.

16. The medium of claim 15, wherein the instructions to retrieve the episode frame tree set, comprise:
instructions to retrieve only a temporal scoped portion, an execution scoped portion, a component-type scoped portion, or an aspect-level scoped portion of the episode frame tree set from the persona context database.

17. The medium of claim 15, wherein the instructions to retrieve the episode frame tree set comprises instructions to retrieve a plurality of episode frame tree sets, including the episode frame tree set, from the persona context database based on the time period, and wherein the instructions to update the current context comprise:
instructions to aggregate the plurality of overlaying the episode frame tree sets to generate an aggregate context based one or more multi-episode aggregation rules of the overlay rule template; and
instructions to update the current context by overlaying the aggregate context based on the overlay rule template.

18. The medium of claim 15, comprising:
instructions to heuristically determine the episode start time and the episode end time of the episode frame tree set based on a change in topic or a delay in communication.

19. The medium of claim 15, comprising:
instructions to identify the episode frame tree set associated with the time period based on the episode start time and the episode end time of the episode frame tree set.

* * * * *